United States Patent
Lin et al.

(10) Patent No.: US 9,148,209 B2
(45) Date of Patent: Sep. 29, 2015

(54) TRANSMISSION METHOD AND DEVICE FOR UPLINK CONTROL CHANNEL

(75) Inventors: Yanan Lin, Beijing (CN); Xueming Pan, Beijing (CN); Guojun Xiao, Beijing (CN)

(73) Assignee: CHINA ACADEMY OF TELECOMMUNICATIONS TECHNOLOGY, Beijing (CN)

( * ) Notice: Subject to any disclaimer, the term of this patent is extended or adjusted under 35 U.S.C. 154(b) by 595 days.

(21) Appl. No.: 13/389,209

(22) PCT Filed: Aug. 6, 2010

(86) PCT No.: PCT/CN2010/075764
§ 371 (c)(1),
(2), (4) Date: Feb. 6, 2012

(87) PCT Pub. No.: WO2011/015146
PCT Pub. Date: Feb. 10, 2011

(65) Prior Publication Data
US 2012/0134332 A1    May 31, 2012

(30) Foreign Application Priority Data
Aug. 7, 2009  (CN) .......................... 2009 1 0090376

(51) Int. Cl.
*H04W 4/00* (2009.01)
*H04B 7/06* (2006.01)
(Continued)

(52) U.S. Cl.
CPC ............ *H04B 7/0619* (2013.01); *H04B 7/0404* (2013.01); *H04B 7/0678* (2013.01); *H04B 7/0689* (2013.01); *H04W 72/04* (2013.01)

(58) Field of Classification Search
CPC .................................................. H04W 72/04
USPC ......................................................... 370/329
See application file for complete search history.

(56) References Cited

U.S. PATENT DOCUMENTS

2003/0235147 A1    12/2003   Walton et al.
2005/0105631 A1*   5/2005    Giannakis et al. ............ 375/267
(Continued)

FOREIGN PATENT DOCUMENTS

CN    1941987 A      4/2007
CN    101043242 A    9/2007
(Continued)

OTHER PUBLICATIONS

Supplementary European Search Report for EP Application No. 10806050.0 dated Mar. 13, 2014.
(Continued)

*Primary Examiner* — Christopher R Crompton
(74) *Attorney, Agent, or Firm* — Foley & Lardner LLP (57) ABSTRACT

A transmission method for uplink control channel is provided, and the method comprises the following steps: a base station configures a transmission mode for the uplink control channel of a user equipment (UE) via high signaling; according to the transmission mode, the base station receives the uplink control channel sent by the UE via a transmit diversity or a single antenna port. A device for implementing the transmission for uplink control channel is also provided. With the present solution, according to the operation state of the system the base station flexibly configures the UE having multiple transmitting antennas to transfer uplink control channel by using different modes, so as to improve the reliability and efficiency of the system and enhance the performance of the system effectively.

14 Claims, 5 Drawing Sheets

(51) Int. Cl.
*H04W 72/04* (2009.01)
*H04B 7/04* (2006.01)

(56) References Cited

U.S. PATENT DOCUMENTS

| | | | |
|---|---|---|---|
| 2006/0023669 A1* | 2/2006 | Yamaura et al. | 370/335 |
| 2008/0013638 A1* | 1/2008 | Walton et al. | 375/260 |
| 2008/0151798 A1 | 6/2008 | Camp | |
| 2010/0004017 A1* | 1/2010 | Kikuchi | 455/522 |
| 2010/0202431 A1* | 8/2010 | Kazmi et al. | 370/342 |
| 2011/0044296 A1* | 2/2011 | Zhang et al. | 370/336 |
| 2011/0134902 A1* | 6/2011 | Ko et al. | 370/344 |

FOREIGN PATENT DOCUMENTS

| | | |
|---|---|---|
| CN | 101150343 A | 3/2008 |
| CN | 101227703 | 7/2008 |
| CN | 101478379 | 7/2009 |
| CN | 101729217 | 6/2010 |
| WO | WO-2008/133576 | 11/2008 |
| WO | WO-2009/037853 A1 | 3/2009 |

OTHER PUBLICATIONS

Communication pursuant to Article 94(3) EPC for EP Application No. 10806050.0 dated Mar. 28, 2014.
Huawei: "Performance of UL multiple antenna transmission for PUCCH", 3GPP TSG RAN WG1#57bis; R1-092383; Los Angeles, USA, Jun. 29-Jul. 3, 2009.
Samsung: "UL Transmit diversity for PUCCH formats 1/1a/1b in LTE-A", 3GPP TSG RAN WG1#57bis; R1-092674; Los Angeles, USA, Jun. 29-Jul. 3, 2009.
Qualcomm Europe: "PUCCH Transmit Diversity", 3GPP TSG RAN WG1#57bis; R1-092711; Los Angeles, USA, Jun. 29-Jul. 3, 2009.
Research in Motion et al: "Transmission Mode Configuration for LTE-A Uplink Transmission", 3GPP TSG RAN WG1#58bis; R1-094108; Miyazaki, Japan, Oct. 12-16, 2009.
International Search Report for PCT/CN2010/075764 dated Nov. 11, 2010.

* cited by examiner

TRANSMISSION METHOD AND DEVICE FOR UPLINK CONTROL CHANNEL

CROSS REFERENCE TO RELATED APPLICATIONS

The present application is a US National Stage of international Application No. PCT/CN2010/075764, filed 6 Aug. 2010, designating the United States, and claiming priority to Chinese Patent Application No. 200910090376.5 filed 7 August 2009. The contents of the foregoing applications are hereby incorporated herein by reference in their entireties.

FIELD

The present invention relates to the field of mobile communications and particularly to a method and device for transmitting an uplink control channel.

BACKGROUND

Mobility and broadband has become development orientations of modern communication, and the 3$^{rd}$ Generation Partnership Project is making an effort to develop a Long Term Evolution (LTE) system as an evolved 3G system for the purpose of evolving a 3GPP radio access oriented toward high data rate, low delay and optimized packet data applications. The multi-antenna technology at the physical layer has become one of crucial technologies for an existing mobile communication system and offers numerous advantages, e.g., a throughput of the system improved due to a multiplexing gain of multiple antennas, the performance of the system improved due to a diversity gain of multiple antennas, interference between users eliminated by distinguishing one user from another due to a directional gain of the antennas, etc.

Figure 1:
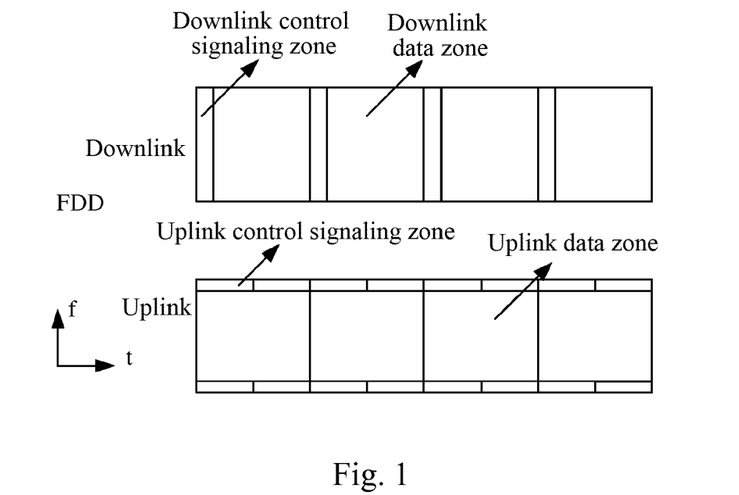
FIG. 1 is a schematic diagram of a frame structure of an FDD system.
Figure 2:
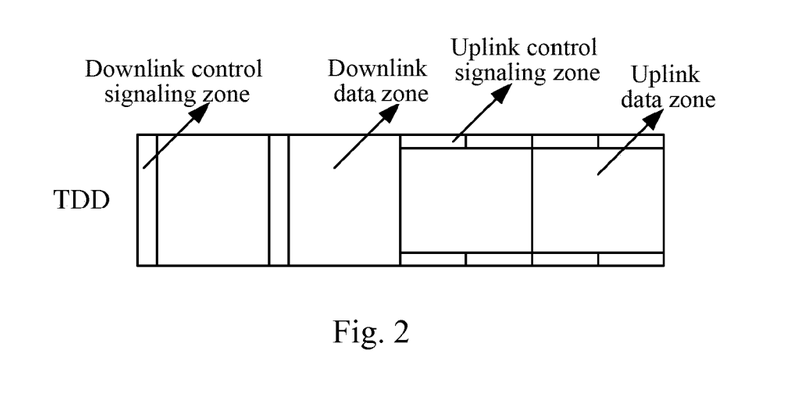
FIG. 2 is a schematic diagram of a frame structure of a TDD system.

At present, the design of the LTE system has been substantially completed in the standardization effort of the 3GPP, and frame structures for a general transmission scheme of the LTE system in an FDD system and a TDD system are as illustrated respectively in FIG. 1 and FIG. 2. Downlink signaling and downlink data, and uplink signaling and uplink data as well their mutual transmission relationships are defined for each operating carrier, where two ends of a frequency band are occupied for uplink control signaling transmitted through frequency-hopping, that is, different frequency ranges will be occupied for transmission of the uplink control signaling in two time slots of a sub-frame.

The uplink control signaling is subject to orthogonal sequence spreading and then mapped into an uplink control channel for transmission, thus a plurality of uplink control channels can be transmitted concurrently on the same Physical Resource Block (PRB). Each uplink control channel corresponds to a unique orthogonal sequence number, and a UE can determine from the orthogonal sequence number an orthogonal spreading sequence for its corresponding uplink control channel and the location of the PRB where the uplink control channel is located.

At present there are two different formats of an uplink control channel, i.e., the format 1/1a/1b and the format 2/2a/2b. ACK/NACK information corresponding to a downlink data packet and an uplink Scheduling Request (SR) is carried in the format 1/1a/1b. Channel quality related information, e.g., a Channel Quality Information (CQI), a Pre-coding Matrix Information (PMI), a Rank Information (RI), etc., is fed back in the format 2/2a/2b.

For a dynamically scheduled downlink data packet, the number of an uplink channel on which ACK/NACK information is fed back (i.e., a orthogonal sequence number) will be derived from the number of a Control Channel Element (CCE) occupied for a downlink control channel on which scheduling information of the data packet is carried, that is, a unique uplink channel resource number can be derived from a CCE number. In an LTE Rel-8 system, a UE will transmit only one uplink control channel at most in each sub-frame due to an uplink limitation arising from uni-carrier transmission, thus an uplink control channel in actual use is an uplink control channel corresponding to a first CCE occupied for a downlink control channel serving the UE.

ACK/NACK corresponding to a persistently scheduled downlink data packet, an SR and a CQI/PMI/RI transmitted in the format 2/2a/2b are fed back periodically, and a base station can know in advance specific temporal locations at which the respective information is transmitted, thus the numbers of channels on which the foregoing control signaling is transmitted are allocated in advance by RRC signaling from the base station to a UE.

In the ongoing study of an uplink control channel for a Long Term Evolution-Advanced system, a possibility has been proposed to use Orthogonal Resource Transmit Diversity (ORTD) for transmit diversity in transmission of an uplink control channel for a UE configured with a plurality of transmission antennas to thereby improve the reliability or capacity of transmitting uplink control signaling. As ORTD implies, each antenna port corresponds to one orthogonal sequence, and the same information is spread in different orthogonal sequences and then transmitted concurrently by different antenna ports. A receiver extracts signals from the different antenna ports and then combines them for detection to thereby achieve a diversity gain.

Figure 3:
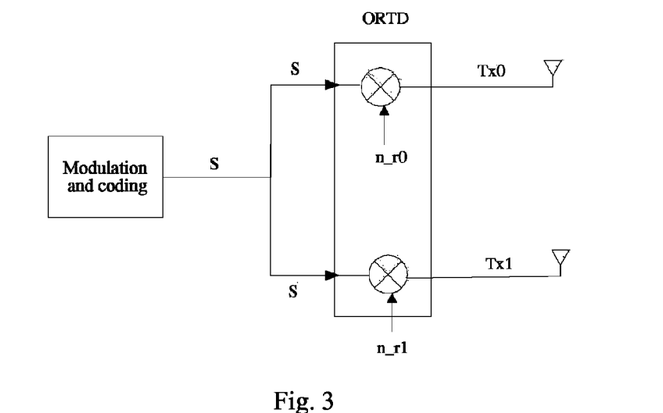
FIG. 3 is a schematic diagram of transmit diversity with two antennas.
Figure 4:
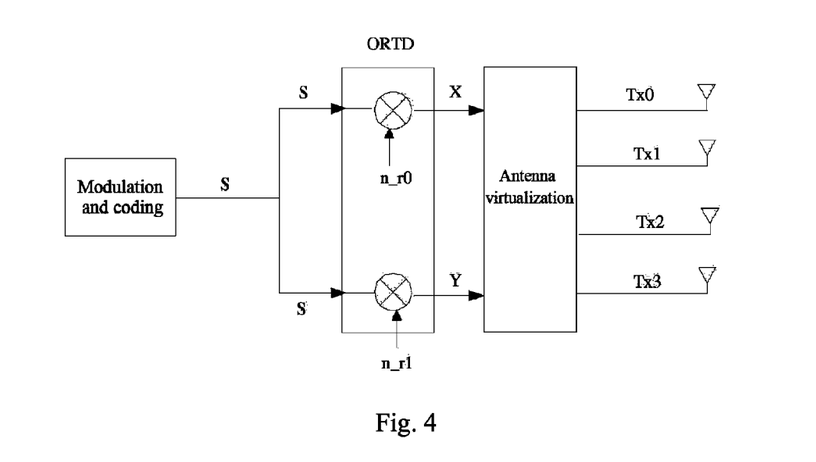
FIG. 4 is a schematic diagram of transmit diversity with four antennas.

FIG. 3 illustrates a schematic diagram of transmit diversity through ORTD with two antennas, where Tx0 and Tx1 represents two transmission antenna, n_r0 and n_r1 represent two orthogonal sequence numbers different from each other, and s represents feedback information. A study shows an insignificant performance gain of ORTD with four antennas as compared with that with two antennas. In view of an overhead of an orthogonal sequence and alike, a hybrid scheme of ORTD and virtual antennas as illustrated in FIG. 4 is recommended for four antennas. As compared with the ORTD-only scheme, a process of virtualizing antennas is added here for transmission of information of two antenna ports on four physical antennas, and this virtualizing process is transparent to a base station, that is, the base station can receive without any knowledge of whether a transmitter transmits on two or four antennas.

Figure 5:
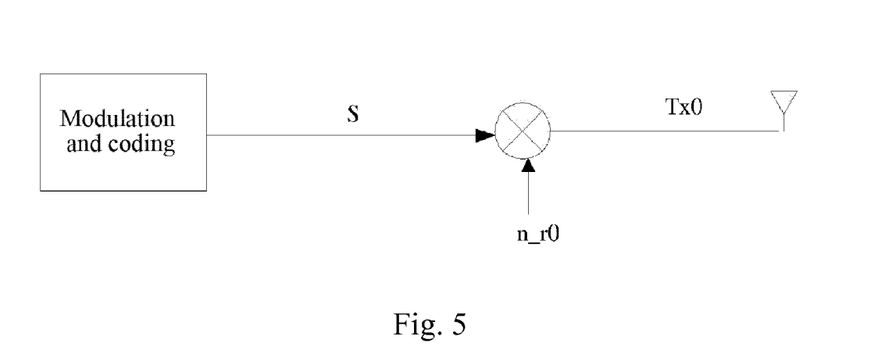
FIG. 5 is a schematic diagram of transmission on a single physical antenna.

Dependent upon a specific transmission condition and demand, a UE configured with a plurality of transmission antennas can alternatively go back to a single antenna port transmission mode which can be performed in the following two approaches:

A first approach is transmission on a single physical antenna as illustrated in FIG. 5, which is the same as that in the LTE Rel-8 system.

Figure 6:
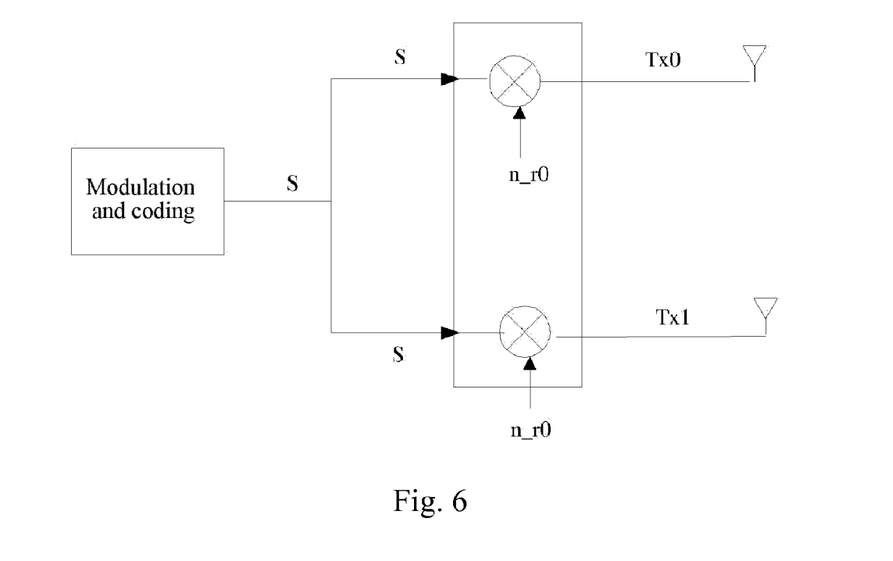
FIG. 6 is a schematic diagram of power combination of two physical antennas.

A second approach is concurrent transmission of the same information with the same orthogonal sequence to thereby improve actual transmit power and hence the reliability of transmission, a schematic diagram of which is as illustrated in FIG. 6.

Transmission in the first or second approach is transparent to a receiver, that is, the receiver can receive and demodulate without any knowledge of which transmission approach is particularly used.

However there is no method for configuring transmission of an uplink control channel in a plurality of transmission modes for a high-level UE configured with a plurality of transmission antennas, making it impossible to make full use of the advantages of the UE being provided with a plurality of transmission antennas, thus it is necessary to propose a corresponding technical solution in which a base station configures flexibly the UE configured with a plurality of transmission antennas dependent upon an operating status of a system to have the UE transmit an uplink control channel in a varying mode.

SUMMARY

An object of the invention is to address at least one of the foregoing technical drawbacks particularly by enabling a base station to configure flexibly a UE configured with a plurality of transmission antennas dependent upon an operating status of a system to have the UE transmit an uplink control channel in a varying mode, thereby improving requirements of the system upon a reliability and an efficiency and enhancing effectively the performance of the system.

In order to attain the foregoing object, an aspect of embodiments of the invention proposes a method for transmitting an uplink control channel including the operations of: a base station configuring a UE with an uplink control channel transmission mode by higher layer signaling; and the base station receiving an uplink control channel transmitted by transmit diversity or an uplink control channel transmitted by a single antenna port from the UE, according to the uplink control channel transmission mode.

Another aspect of the embodiments of the invention further proposes a method for transmitting an uplink control channel including the operations of: a user equipment receiving higher layer signaling transmitted from a base station and acquiring information on an uplink control channel transmission mode; and the user equipment transmitting an uplink control channel by transmit diversity or transmitting an uplink control channel by a single antenna port to the base station according to the uplink control channel transmission mode.

Another aspect of the embodiments of the invention further proposes a base station including a configuring module, a transmitting module and a receiving module, wherein the configuring module is configured to configure a UE with an uplink control channel transmission mode; the transmitting module is configured to transmit the uplink control channel transmission mode to the UE by higher layer signaling; and the receiving module is configured to receive an uplink control channel transmitted by transmit diversity or an uplink control channel transmitted by a single antenna port from the UE according to the uplink control channel transmission mode.

Another aspect of the embodiments of the invention further proposes a User Equipment, UE, including a receiving module and a transmitting module, wherein the receiving module is configured to receive higher layer signaling transmitted from a base station and to acquire information on an uplink control channel transmission mode; and the transmitting module is configured to transmit an uplink control channel by transmit diversity or transmit an uplink control channel by a single antenna port to the base station.

In the technical solutions according to the embodiments of the invention, a base station configures flexibly a UE configured with multiple transmission antennas dependent upon an operating status of a system to have the UE transmit an uplink control channel in a varying mode, thereby improving requirements of the system upon a reliability and an efficiency and enhancing effectively the performance of the system. The foregoing solution according to the embodiments of the invention can be applicable to both an FDD system and a TDD system with a minor modification to the existing system without any influence upon the compatibility of the system and can be simple and efficient to implement.

Additional aspects and advantages of the invention will partly be presented in the following description, partly become apparent in the following description or be appreciated in practicing of the invention.

BRIEF DESCRIPTION OF THE DRAWINGS

The foregoing and/or additional aspects and advantages of the invention will become apparent and readily understood in the foregoing description of embodiments taken in conjunction with the drawings in which.

DETAILED DESCRIPTION

Embodiments of the invention will be detailed below, and examples of the embodiments will be illustrated in the drawings throughout which identical or similar reference numerals represent identical or similar elements or functionally identical or similar elements. The embodiments described below with reference to the drawings are illustrative and merely intended to set forth but not construed to limit the invention.

In a technical solution according to the invention, two uplink control channel transmission modes are supported for a User Equipment (UE) configured with a plurality of transmission antennas.

In a first mode, the UE transmits an uplink control channel fixedly by a single antenna port by transmitting an uplink control channel in the single antenna port transmission mode as introduced in the Background.

In a second mode, the UE can transmit an uplink control channel by multiple antenna ports, and here the mode can be further performed in two handling methods dependent upon a varying number of available orthogonal sequences with which an uplink control channel are transmitted:

In a first handling method, if there is only one available orthogonal sequence, then the UE can transmit an uplink control channel in the single antenna port transmission mode as introduced in the Background. For ACK/NACK corresponding to a dynamically scheduled downlink data packet, an aggregation level of PDCCH CCEs is 1 and there is only one available orthogonal sequence; and for ACK/NACK corresponding to a persistently scheduled downlink data packet, an SR, and a CQI/PMI/RI transmitted in the format 2/2a/2b, a base station configures the UE with one available orthogonal sequence number by RRC signaling.

In a second handling method, if there are a plurality of available orthogonal sequences, the UE can transmit uplink control signaling by multiple antenna ports to achieve a diversity gain as illustrated in FIG. 3 and FIG. 4 in the Background. For ACK/NACK corresponding to a dynamically scheduled downlink data packet with an aggregation level of PDCCH CCEs above 1, orthogonal sequences corresponding to first two CCEs of a Physical Downlink Control Channel (PDCCH) can be used, and if a specific condition of a transmission channel determines that an uplink control channel of a specific user must be transmitted by transmit diversity, then a base station can limit the aggregation level of PDCCH CCEs corresponding to the user to at least 2; and for ACK/NACK corresponding to a persistently scheduled downlink data packet, an SR, and a CQI/PMI/RI transmitted in the format 2/2a/2b, a base station configures the UE with two available orthogonal sequence numbers by RRC signaling.

The transmission modes defined according to the invention are as depicted in the table below:

| Transmission mode | Orthogonal sequence resource | Transmission method |
|---|---|---|
| Mode 1 | At least one available orthogonal sequence resource | Transmission by a single antenna port |
| Mode 2 | Only one available orthogonal sequence resource | Transmission by a single antenna port |
|  | A plurality of available orthogonal sequence resource | Transmit diversity |

Thus, in order to attain the object of the invention, an embodiment of the invention proposes a method for transmitting an uplink control channel including the operations of: a base station configures a UE with an uplink control channel transmission mode by higher layer signaling; and the base station receiving an uplink control channel transmitted by transmit diversity or an uplink control channel transmitted by a single antenna port from the UE according to the uplink control channel transmission mode.

Figure 7:
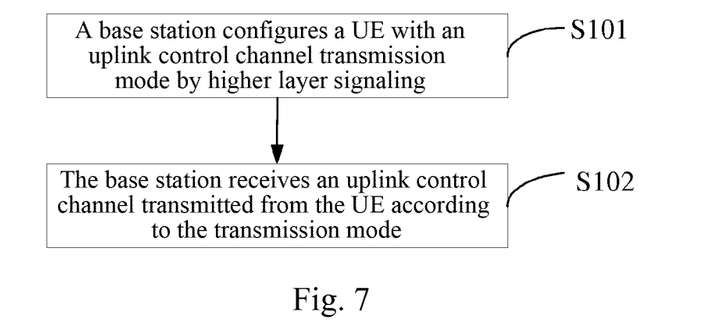
FIG. 7 is a flow chart of a method for transmitting an uplink control channel at the side of a base station according to an embodiment of the invention.

FIG. 7 illustrates a flow chart of a method for transmitting an uplink control channel at the side of a base station according to an embodiment of the invention. The method includes the following operations S101 and S102:

S101: A base station configures a UE with an uplink control channel transmission mode by higher layer signaling.

In the operation S101, the base station configures a UE with an uplink control channel transmission mode by higher layer signaling, e.g., RRC signaling, etc. The transmission mode is categorized into a first mode and a second mode.

Further in connection with a specific system, the first mode includes:

For ACK/NACK corresponding to a dynamically scheduled downlink data packet, the base station determines an aggregation level of PDCCH CCEs, and taking a targeted PDCCH detection reliability as an example, the aggregation level of PDCCH CCEs is selected from a first set of aggregation levels including the aggregation level of 1, and the first set of aggregation levels can include 1, 2, 4 and 8.

For ACK/NACK corresponding to a persistently scheduled downlink data packet, an SR, and a CQI/PMI/RI transmitted in the format 2/2a/2b, the base station configures the UE with one available orthogonal sequence resource by RRC signaling.

The second mode includes:

For ACK/NACK corresponding to a dynamically scheduled downlink data packet, the base station determines an aggregation level of PDCCH CCEs, and taking a PDCCH detection reliability and the selected uplink control channel transmission mode as an example, if an uplink control channel is transmitted by transmit diversity, then the aggregation level of PDCCH CCEs is selected from a second set of aggregation levels in which the aggregation level of 1 is absent, and the second set of aggregation levels can include 2, 4 and 8; otherwise, the aggregation level of PDCCH CCEs is selected from the first set of aggregation levels including the aggregation level of 1, and the first set of aggregation levels can include 1, 2, 4 and 8.

For ACK/NACK corresponding to a persistently scheduled downlink data packet, an SR, and a CQI/PMI/RI transmitted in the format 2/2a/2b, the base station configures the UE with two available orthogonal sequence resources by RRC signaling.

Thus corresponding to the different transmission modes, the UE transmits an uplink control channel by a single antenna port on one available orthogonal sequence resource and the aggregation level of PDCCH CCEs is an aggregation level determined by a PDCCH detection reliability when the base station configures the UE with the first mode. Typically, a different PDCCH detection reliability corresponds to a different coding rate, and the PDCCH detection reliability is guaranteed by selecting the corresponding coding rate so that a corresponding CCE aggregation level can be determined after selecting a coding rate, that is, the number of CCEs required for carrying and thus a corresponding CCE aggregation level can be determined after PDCCH data to be transmitted and a coding rate is known.

When the base station configures the UE with the second mode, the base station allocates more than one available orthogonal sequence resource to the UE, and the UE transmits by multiple antenna ports with corresponding orthogonal sequences using transmit diversity; or the base station allocates one available orthogonal sequence resource to the UE, and the UE transmits an uplink control channel by a single antenna port. Furthermore when the UE transmits an uplink control channel by a single antenna port, the system can support switching between a single physical antenna transmission mode and a multiple physical antennas transmission mode, and the UE can perform switching by itself dependent upon a specific situation. For example, when the UE transmits an uplink control channel by a single antenna port, the UE determines by itself the number of physical antennas for use according to a Transmission Power Control (TPC) of an uplink control channel on a PDCCH: when transmit power adjusted according to the TPC exceeds the maximum transmit power of a single antenna, the UE transmits an uplink control channel concurrently on multiple physical antennas; otherwise, the UE transmits an uplink control channel on a single physical antenna.

Particularly determining the aggregation level of PDCCH CCEs in the second mode further includes:

if the UE transmits an uplink control channel by transmit diversity, the aggregation level of PDCCH CCEs is max {2, the aggregation level determined by the PDCCH detection reliability}; otherwise, the aggregation level of PDCCH CCEs is the aggregation level determined by the PDCCH detection reliability.

S102: The base station receives an uplink control channel transmitted from the UE according to the transmission mode.

Since the base station can know the specific transmission mode of the UE after initial configuring, the base station receives by transmit diversity if the UE transmits by diversity; otherwise, the base station receives by a single antenna port, in the operation S102.

An embodiment of the invention further proposes a method for transmitting an uplink control channel including the following operations: a user equipment receiving higher layer signaling transmitted from a base station and acquiring information on an uplink control channel transmission mode; and the user equipment transmitting an uplink control channel by transmit diversity or transmitting an uplink control channel by a single antenna port to the base station according to the transmission mode.

Figure 8:
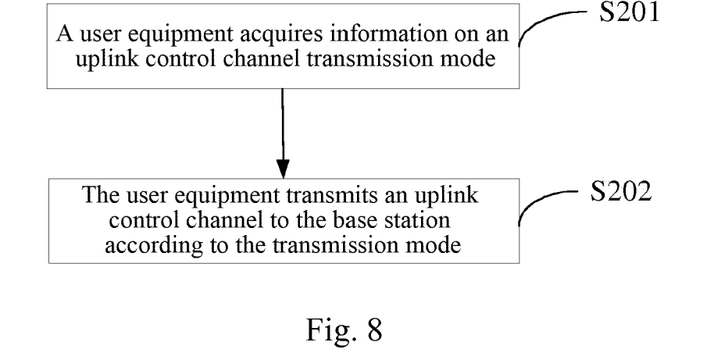
FIG. 8 is a flow chart of a method for transmitting an uplink control channel at the side of a user equipment according to an embodiment of the invention.

FIG. 8 illustrates a flow chart of a method for transmitting an uplink control channel at the side of a user equipment according to an embodiment of the invention. The method includes the following operations S201 and S202:

S201: A user equipment acquires information on an uplink control channel transmission mode.

In the operation S201, the user equipment receives the higher layer signaling transmitted from a base station and acquires the information on the uplink control channel transmission mode.

Particularly the transmission mode includes a first mode and a second mode.

When the transmission mode is the first mode, the UE transmits an uplink control channel by a single antenna port.

When the transmission mode is the second mode, the UE acquires an available sequence resource by detecting PDCCH information or the higher layer signaling and transmits an uplink control channel by transmit diversity or transmits an uplink control channel by a single antenna port to the base station.

S202: The user equipment transmits an uplink control channel to the base station according to the transmission mode.

In the operation S202, the user equipment transmits an uplink control channel by transmit diversity or transmits an uplink control channel by a single antenna port to the base station according to the transmission mode.

Particularly when the transmission mode is the second mode and there is more than one available orthogonal sequence resource, the UE transmits by multiple antenna ports with corresponding orthogonal sequences using transmit diversity; or when there is one available orthogonal sequence resource, the UE transmits an uplink control channel using a single antenna port.

Furthermore when the UE transmits an uplink control channel by a single antenna port, the system can support switching between two transmission modes of a single physical antenna transmission mode and a multiple physical antennas transmission mode, and the UE can perform switching by itself dependent upon a specific situation. For example, when the UE transmits an uplink control channel by a single antenna port, the UE determines by itself the number of physical antennas for use according to a Transmission Power Control (TPC) of an uplink control channel on a PDCCH: when transmit power adjusted according to the TPC exceeds the maximum transmit power of a single antenna, the UE transmits an uplink control channel concurrently on multiple physical antennas; otherwise, the UE transmits an uplink control channel on a single physical antenna.

Figure 9:
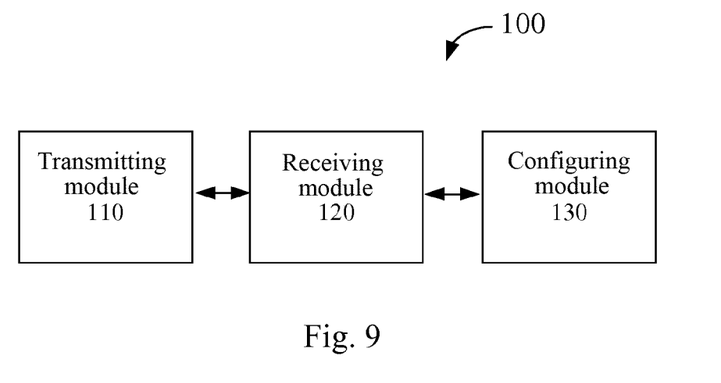
FIG. 9 is a schematic structural diagram of a base station according to an embodiment of the invention.

As illustrated in FIG. 9, an embodiment of the invention further proposes a base station 100 including a configuring module 130, a transmitting module 110 and a receiving module 120.

Particularly the configuring module 130 is configured to configure a UE with an uplink control channel transmission mode; the transmitting module 110 is configured to transmit the uplink control channel transmission mode to the UE by higher layer signaling; and the receiving module 120 is configured to receive an uplink control channel transmitted by transmit diversity or an uplink control channel transmitted by a single antenna port from the UE, according to the uplink control channel transmission mode.

In an embodiment of the base station 100, the transmission mode includes a first mode and a second mode.

Particularly the first mode includes:

For ACK/NACK corresponding to a dynamically scheduled downlink data packet, the configuring module 130 determines an aggregation level of PDCCH CCEs, where the aggregation level of PDCCH CCEs is selected from a first set of aggregation levels. The first set of aggregation levels includes the aggregation level of 1, and the first set of aggregation levels can include 1, 2, 4 and 8. For ACK/NACK corresponding to a persistently scheduled downlink data packet, an SR, and a CQI/PMI/RI transmitted in the format 2/2a/2b, the configuring module 130 configures the UE with one available orthogonal sequence resource.

The second mode includes:

For ACK/NACK corresponding to a dynamically scheduled downlink data packet, the configuring module 130 determines an aggregation level of PDCCH CCEs, and if an uplink control channel is transmitted by transmit diversity, then the aggregation level of PDCCH CCEs is selected from a second set of aggregation levels in which the aggregation level of 1 is absent, and the second set of aggregation levels can include 2, 4 and 8; otherwise, the aggregation level of PDCCH CCEs is selected from the first set of aggregation levels including the aggregation level of 1, and the first set of aggregation levels can include 1, 2, 4 and 8. For ACK/NACK corresponding to a persistently scheduled downlink data packet, an SR, and a CQI/PMI/RI transmitted in the format 2/2a/2b, the configuring module 130 configures the UE with two available orthogonal sequence resources.

In an embodiment of the base station 100, the UE transmits an uplink control channel by a single antenna port on one available orthogonal sequence resource and the aggregation level of PDCCH CCEs is an aggregation level determined by a PDCCH detection reliability when the configuring module 130 configures the UE with the first mode.

In an embodiment of the base station 100, when the configuring module 130 configures the UE with the second mode, the base station 100 allocates more than one available orthogonal sequence resource to the UE, and the UE transmits by multiple antenna ports with corresponding orthogonal sequences using transmit diversity; or the base station 100 allocates one available orthogonal sequence resource to the UE, and the UE transmits an uplink control channel by a single antenna port.

In an embodiment of the base station 100, determining the aggregation level of PDCCH CCEs in the second mode includes: if the UE transmits an uplink control channel by transmit diversity, the aggregation level of PDCCH CCEs is max {2, the aggregation level determined by the PDCCH detection reliability}; otherwise, the aggregation level of PDCCH CCEs is the aggregation level determined by the PDCCH detection reliability.

Figure 10:
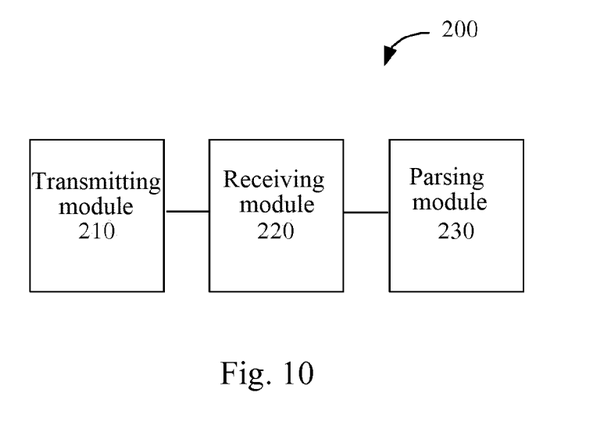
FIG. 10 is a schematic structural diagram of a user equipment according to an embodiment of the invention.

As illustrated in FIG. 10, an embodiment of the invention further proposes a UE 200 including a receiving module 220 and a transmitting module 210.

Particularly the receiving module 220 is configured to receive higher layer signaling transmitted from a base station and to acquire information on an uplink control channel transmission mode; and the transmitting module 210 is configured to transmit an uplink control channel by transmit diversity or transmit an uplink control channel by a single antenna port to the base station.

In an embodiment of the UE 200, the UE 200 further includes a parsing module 230 configured to parse the information on the transmission mode including a first mode and a second mode.

When the transmission mode is the first mode, the transmitting module 210 transmits an uplink control channel by a single antenna port; or when the transmission mode is the second mode, the receiving module 220 acquires an available sequence resource by detecting PDCCH information or the higher layer signaling, and the transmitting module 210 transmits an uplink control channel by transmit diversity or transmits an uplink control channel by a single antenna port to the base station.

In an embodiment of the UE 200, when the transmission mode is the second mode and there is more than one available orthogonal sequence resource, the transmitting module 210 transmits by multiple antenna ports with corresponding orthogonal sequences using transmit diversity; or when there is one available orthogonal sequence resource, the transmitting module 210 transmits an uplink control channel using a single antenna port.

In an embodiment of the UE 200, the transmitting module 210 transmits an uplink control channel by a single antenna port on one or more physical antennas, the UE 200 determines by itself the number of physical antennas for use according to a Transmission Power Control (TPC) of an uplink control channel on a PDCCH from the base station: when transmit power adjusted according to the TPC exceeds the maximum transmit power of a single antenna, the transmitting module 210 transmits an uplink control channel concurrently on multiple physical antennas; otherwise, the transmitting module 210 transmits an uplink control channel on a single physical antenna.

In the technical solution according to the embodiments of the invention, a base station configures flexibly a UE configured with multiple transmission antennas dependent upon an operating status of a system to have the UE transmit an uplink control channel in a varying mode, thereby improving requirements of the system upon a reliability and an efficiency and enhancing effectively the performance of the system. The foregoing solution according to the embodiments of the invention can be applicable to both an FDD system and a TDD system with a minor modification to the existing system without any influence upon the compatibility of the system and can be simple and efficient to implement.

Those ordinarily skilled in the art can appreciate that all or a part of the operations in the methods according to the embodiments can be performed in program instructing relevant hardware, and the program can be stored in a computer readable storage medium and perform when being executed any one or combination of the operations in the embodiments of the methods.

Furthermore the respective functional modules in the respective embodiments of the invention can be integrated in a processing module or physically present separately from each other, or two or more of the modules can be integrated in a module. The integrated module can be embodied in the form of hardware or a software functional module. The integrated module can also be stored in a computer readable storage medium if it is embodied in the form of a software functional module and sold or used as a stand-alone product.

The storage medium mentioned above can be a read-only memory, a magnetic disk, an optical disk, etc.

The foregoing description is merely illustrative of the preferred embodiments of the invention, and it shall be noted that those ordinarily skilled in the art can further make several modifications and variations thereto without departing from the principle of the invention and that these modifications and variations shall also be deemed as coming into the claimed scope of the invention.

The invention claimed is:

1. A method for transmitting an uplink control channel, comprising:

a base station configuring a User Equipment (UE), with an uplink control channel transmission mode by higher layer signaling; and the base station receiving an uplink control channel transmitted by transmit diversity or an uplink control channel transmitted by a single antenna port from the UE, according to the uplink control channel transmission mode;

wherein the transmission mode comprises a first mode and a second mode, and in the first mode:

for ACK/NACK corresponding to a dynamically scheduled downlink data packet, the base station determines an aggregation level of Physical Downlink Control Channel, (PDCCH), Control Channel Elements, (CCEs), wherein the aggregation level of PDCCH CCEs is selected from a first set of aggregation levels; and for ACK/NACK corresponding to a persistently scheduled downlink data packet, an uplink Scheduling Request, (SR), and a Channel Quality Information, (CQI), a Precoding Matrix Information, (PMI), and a Rank Information, (RI), transmitted in a format 2/2a/2b, the base station configures the UE with one available orthogonal sequence resource by the higher layer signaling; and in the second mode:

for ACK/NACK corresponding to a dynamically scheduled downlink data packet, the base station determines an aggregation level of PDCCH CCEs, and if an uplink control channel is transmitted by transmit diversity, then the aggregation level of PDCCH CCEs is selected from a second set of aggregation levels; otherwise, the aggregation level of PDCCH CCEs is selected from the first set of aggregation levels; and for ACK/NACK corresponding to a persistently scheduled downlink data packet, an SR and a CQI/PMI/RI transmitted in the format 2/2a/2b, the base station configures the UE with two available orthogonal sequence resources by higher layer signaling, and wherein the first set of aggregation levels comprises an aggregation level of 1, and the second set of aggregation levels does not comprise the aggregation level of 1.

2. The method for transmitting an uplink control channel according to claim 1, wherein:

the first set of aggregation levels comprises 1, 2, 4 and 8; and the second set of aggregation levels comprises 2, 4 and 8.

3. The method for transmitting an uplink control channel according to claim 1, wherein, when the base station configures the UE with the first mode, the UE transmits an uplink control channel by a single antenna port on one available orthogonal sequence resource, and the aggregation level of PDCCH CCEs is an aggregation level determined by a PDCCH detection reliability; or when the base station configures the UE with the second mode, the base station allocates more than one available orthogonal sequence resource to the UE, and the UE transmits on multiple antenna ports with corresponding orthogonal sequences using transmit diversity; or the base station allocates one available orthogonal sequence resource to the UE, and the UE transmits an uplink control channel using a single antenna port.

4. The method for transmitting an uplink control channel according to claim 3, wherein the UE transmits an uplink control channel by a single antenna port on one or more physical antennas and determines by itself the number of physical antennas for use according to a Transmission Power Control (TPC), of an uplink control channel over a PDCCH from the base station:

if transmit power adjusted according to the TPC exceeds the maximum transmit power of a single antenna, the UE transmits an uplink control channel concurrently on multiple physical antennas; otherwise, the UE transmits an uplink control channel on a single physical antenna.

5. The method for transmitting an uplink control channel according to claim 1, wherein determining the aggregation level of PDCCH CCEs in the second mode comprises:

if the UE transmits an uplink control channel by transmit diversity, the aggregation level of PDCCH CCEs is max {2, an aggregation level determined by a PDCCH detection reliability}; otherwise, the aggregation level of PDCCH CCEs is the aggregation level determined by the PDCCH detection reliability.

6. A method for transmitting an uplink control channel, comprising:

a user equipment receiving higher layer signaling transmitted from a base station and acquiring information on an uplink control channel transmission mode; and the user equipment transmitting an uplink control channel by transmit diversity or transmitting an uplink control channel by a single antenna port to the base station, according to the uplink control channel transmission mode;

wherein the transmission mode comprises a first mode and a second mode, and when the transmission mode is the first mode, the User Equipment (UE), transmits an uplink control channel by a single antenna port; and when the transmission mode is the second mode, the UE acquires one or more available sequence resources by detecting Physical Downlink Control Channel (PDCCH), information or the higher layer signaling and transmits an uplink control channel by transmit diversity or transmits an uplink control channel by a single antenna port to the base station;

wherein when the transmission mode is the second mode, when the number of available orthogonal sequence resources is more than 1, the UE transmits on multiple antenna ports with corresponding orthogonal sequences using transmit diversity; and when the number of available orthogonal sequence resources is 1, the UE transmits an uplink control channel using a single antenna port.

7. The method for transmitting an uplink control channel according to claim 6, wherein when the UE transmits the uplink control channel by the single antenna port, the UE transmits the uplink control channel by the single antenna port on one or more physical antennas and determines by itself the number of physical antennas for use according to a Transmission Power Control (TPC), of an uplink control channel over a PDCCH from the base station:

if transmit power adjusted according to the TPC exceeds the maximum transmit power of a single antenna, the UE transmits the uplink control channel concurrently on multiple physical antennas; otherwise, the UE transmits the uplink control channel on a single physical antenna.

8. A base station, comprising a memory; and one or more processors, wherein:

the memory is configured to store computer readable program codes, and the one or more processors execute the computer readable program codes to implement a configuring module, a transmitting module and a receiving module, wherein:

the configuring module is configured to configure a User Equipment (UE), with an uplink control channel transmission mode;

the transmitting module is configured to transmit the uplink control channel transmission mode to the UE by higher layer signaling; and the receiving module is configured to receive an uplink control channel transmitted by transmit diversity or an uplink control channel transmitted by a single antenna port from the UE, according to the uplink control channel transmission mode;

wherein the transmission mode comprises a first mode and a second mode, and in the first mode, for ACK/NACK corresponding to a dynamically scheduled downlink data packet, the configuring module determines an aggregation level of Physical Downlink Control Channel (PDCCH), Control Channel Elements (CCEs), wherein the aggregation level of PDCCH CCEs is selected from a first set of aggregation levels; and for ACK/NACK corresponding to a persistently scheduled downlink data packet, a Scheduling Request (SR), and a Channel Quality Information (CQI), a Pre-coding Matrix Information (PMI), and a Rank Information (RI), transmitted in a format 2/2a/2b, the configuring module configures the UE with one available orthogonal sequence resource; and in the second mode:

for ACK/NACK corresponding to a dynamically scheduled downlink data packet, the configuring module determines an aggregation level of PDCCH CCEs, and if an uplink control channel is transmitted by transmit diversity, then the aggregation level of PDCCH CCEs is selected from a second set of aggregation levels; otherwise, the aggregation level of PDCCH CCEs is selected from the first set of aggregation levels; and for ACK/NACK corresponding to a persistently scheduled downlink data packet, an SR and a CQI/PMI/RI transmitted in the format 2/2a/2b, the configuring module configures the UE with two available orthogonal sequence resources, and wherein the first set of aggregation levels comprises an aggregation level of 1, and the second set of aggregation levels does not comprise the aggregation level of 1.

9. The base station of claim 8, wherein:

the first set of aggregation levels comprises 1, 2, 4 and 8; and the second set of aggregation levels comprises 2, 4 and 8.

10. The base station of claim 8, wherein, when the configuring module configures the UE with the first mode, the UE transmits an uplink control channel by a single antenna port on one available orthogonal sequence resource, and the aggregation level of PDCCH CCEs is an aggregation level determined by a PDCCH detection reliability; or when the configuring module configures the UE with the second mode, the base station allocates more than one available orthogonal sequence resource to the UE, and the UE transmits on multiple antenna ports with corresponding orthogonal sequences using transmit diversity; or the base station allocates one available orthogonal sequence resource to the UE, and the UE transmits an uplink control channel using a single antenna port.

11. The base station of claim 8, wherein determining the aggregation level of PDCCH CCEs in the second mode comprises:

if the UE transmits an uplink control channel by transmit diversity, the aggregation level of PDCCH CCEs is max{2, an aggregation level determined by a PDCCH detection reliability}; otherwise, the aggregation level of PDCCH CCEs is the aggregation level determined by the PDCCH detection reliability.

12. A User Equipment (UE), comprising a memory; and one or more processors, wherein:

the memory is configured to store computer readable program codes, and the one or more processors execute the computer readable program codes to implement a receiving module and a transmitting module, wherein:

the receiving module is configured to receive higher layer signaling transmitted from a base station and to acquire information on an uplink control channel transmission mode; and the transmitting module is configured to transmit an uplink control channel by transmit diversity or transmit an uplink control channel by a single antenna port to the base station;

wherein the transmitting module comprises a first mode and a second mode, and when the transmission mode is the first mode, the transmitting module transmits an uplink control channel by a single antenna port; or when the transmission mode is the second mode, the receiving module acquires one or more available sequence resources by detecting Physical Downlink Control Channel (PDCCH), information or the higher layer signaling, and the transmitting module transmits an uplink control channel by transmit diversity or transmits an uplink control channel by a single antenna port to the base station;

wherein when the transmission mode is the second mode, when there is more than one available orthogonal sequence resource, the transmitting module transmits on multiple antenna ports with corresponding orthogonal sequences using transmit diversity; and when there is one available orthogonal sequence resource, the transmitting module transmits an uplink control channel using a single antenna port.

13. The UE of claim 12, further comprising a parsing module configured to parse the information on the transmitting mode.

14. The UE of claim 13, wherein when the transmitting module transmits the uplink control channel by the single antenna port, the transmitting module transmits the uplink control channel by the single antenna port on one or more physical antennas, the UE determines by itself the number of physical antennas for use according to a Transmission Power Control (TPC), of an uplink control channel over a PDCCH from the base station:

if transmit power adjusted according to the TPC is exceeds the maximum transmit power of a single antenna, the transmitting module transmits the uplink control channel concurrently on multiple physical antennas; otherwise, the transmitting module transmits the uplink control channel on a single physical antenna.

* * * * *